(12) United States Patent
Kondo et al.

(10) Patent No.: US 7,098,430 B2
(45) Date of Patent: Aug. 29, 2006

(54) HEATING APPARATUS WITH TARGET TEMPERATURE CONTROL AND MEANS FOR CHANGING TARGET TEMPERATURE

(75) Inventors: Toshiharu Kondo, Moriya (JP); Tokihiko Ogura, Kashiwa (JP); Yasuo Nami, Toride (JP); Naoyuki Yamamoto, Toride (JP); Takahiro Nakase, Toride (JP); Hitoshi Suzuki, Matsudo (JP); Yasuhiro Yoshimura, Ryugasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/068,920

(22) Filed: Mar. 2, 2005

(65) Prior Publication Data

US 2005/0211700 A1    Sep. 29, 2005

(30) Foreign Application Priority Data

Mar. 5, 2004    (JP)    ............................. 2004-062446

(51) Int. Cl.
*H05B 6/14* (2006.01)
*G03G 15/20* (2006.01)

(52) U.S. Cl. ...................... 219/619; 219/670; 219/667; 399/328; 399/330

(58) Field of Classification Search ................ 219/619, 219/670, 661–668; 399/328–338
See application file for complete search history.

(56) References Cited

U.S. PATENT DOCUMENTS

| | | | |
|---|---|---|---|
| 2003/0077093 A1* | 4/2003 | Sekiguchi | ................... 399/328 |
| 2004/0253027 A1* | 12/2004 | Kato et al. | ................... 399/328 |
| 2005/0006378 A1* | 1/2005 | Suzuki | ........................ 219/619 |

* cited by examiner

*Primary Examiner*—Philip H. Leung
(74) *Attorney, Agent, or Firm*—Fitzpatrick, Cella, Harper & Scinto

(57) ABSTRACT

Information on a temperature of a heat generation member at a position which is in the neighborhood of an end portion of a conveyance area of a material, to be heated, having a maximum size and in the neighborhood of a non-conveyance area of a material, to be heated, having a size smaller than the maximum size is detected by temperature information detector, and a changer lowers a target temperature of the heat generation member depending on a detection result of the temperature information detector. Thereafter, when the detection result of the temperature information detector reaches a predetermined temperature, a magnetic flux adjusting member is started to be moved by a moving device.

7 Claims, 6 Drawing Sheets

HEATING APPARATUS WITH TARGET TEMPERATURE CONTROL AND MEANS FOR CHANGING TARGET TEMPERATURE

FIELD OF THE INVENTION AND RELATED ART

The present invention relates to an image heating apparatus, of an electromagnetic induction heating type, for heating an image on a recording material as a material to be heated.

In an image forming apparatus, of an electrophotographic type, such as a copying machine, a printer, a facsimile apparatus, a multiple function processing machine thereof, etc., a heating apparatus for introducing and conveying a recording material, as a material to be heated, onto which a developer (toner) image is transferred from a rotation drum-type electrophotographic photosensitive member (hereinafter, referred to as a "photosensitive drum") as an image bearing member, into a nip between a heating medium and a pressing member to melt-fix the developer on the recording material surface through heat fusion is provided.

As the heating apparatus, in order to realize high-speed temperature rise, there have been known those in which a fixing roller as the heating medium is made thin and small in size, in which a heating member is internally pressed against a rotation member of a resin film, and in which a thin metal rotation member is heated by induction heating. In any case, a heat capacity of the rotation member as the heating medium is made small, so that heating is intended to be effected by a heat source having a good heating efficiency. Further, a heating apparatus using a non-contact type heat source has also been known. However, from the viewpoint of cost and energy, in the image forming apparatus such as the copying machine, many heating apparatuses of such a type that a thin rotation member is caused to contact the recording material, thereby to melt the developer on the recording material under heating, have been proposed.

However, in the case where the thin rotation member is used as the heating medium in order to reduce the heat capacity, a cross-sectional area of the rotation member in a direction perpendicular to an axis thereof becomes very small, so that a heat transfer efficiency in the axis direction becomes worse. This tendency is more noticeable with a thinner rotation member, and the heat transfer efficiency is further lowered with respect to a material, such as a resin or the like, having a low heat conductivity.

These phenomenon are of no problem in the case where a recording material having a width corresponding to a full length of the rotation member in a lengthwise (longitudinal) direction thereof, i.e., a recording material having a maximum sheet passing width, is passed through a nip (portion) to effect fixation. However, in the case where a small-sized recording material having a small width is continuously passed through the nip, there has arisen such a problem that a temperature of the rotation member in a non-sheet passing area (portion) becomes higher than a controlled (or adjusted) temperature, thus resulting in a considerable temperature difference between a sheet passing area (portion) and the non-sheet passing area (portion).

Accordingly, due to such a temperature irregularity in the lengthwise direction of the heating medium, there is a possibility that a peripheral member formed of a resinous material is lowered in heat-resistant life or thermally broken. Further, when a large-sized recording material is passed through the nip immediately after a small-sized recording material is continuously passed, there is a possibility that crease, skew or the like of paper and a fixation irregularity are caused to occur due to the partial temperature irregularity.

Such a temperature difference between the sheet passing area and the non-sheet passing area becomes larger with a larger heat capacity of the conveyed recording material and a higher throughput (the number of printed sheets per unit time). For this reason, in the case where the heating apparatus is constituted by a thin and low-heat capacity rotation member, it has become difficult to apply the heating apparatus to a high-throughput copying machine.

On the other hand, with respect to a heating apparatus using a halogen lamp or a heat resistance element as the heat source, there has been known such a heating apparatus that the heat source is divided into a plurality of heat source elements and an appropriate heat source element is selectively energized so as to heat an area depending on a sheet passing width.

Similarly, also with respect to a heating apparatus using an induction coil as the heat source, such a heating apparatus that the heat source is divided into a plurality of heat source elements, which are selectively energized, has been known. However, when a plurality of heat sources are used or the heat source is divided into plural elements, a control circuit therefor is complicated and a production cost is increased by that much. Further, when the heating apparatus is intended to be adopted to recording materials of various widths, the number of division of the heat source and the production cost are further increased. In addition, when the thin rotation member is used as the heating medium, there is a possibility that a temperature distribution in the neighborhood of boundaries between respective divided heat source elements becomes discontinuous and ununiform, thus adversely affecting a fixing performance.

In view of these circumstances, there have been proposed a heating apparatus provided with a magnetic flux adjusting means having such a structure that a magnetic flux adjusting member for adjusting a density distribution of magnetic flux extending from an induction heat source to a heating medium is disposed between the heating medium and the induction heat source and is moved by a moving means (e.g., Japanese Laid-Open Patent Applications Nos. HEI 09-171889 and HEI 10-74009).

In such a heating apparatus, the magnetic flux extending from the induction heat source is shielded (blocked) with the magnetic flux adjusting member at a portion other than a necessary portion (sheet passing area or portion) by mixing the magnetic flux adjusting member by use of the moving means, so that heat generation itself in the non-sheet passing area is suppressed. Accordingly, it becomes possible to control the heat generation range to permit control of a heat distribution of the heating medium to be heated.

However, in the above described electro-magnetic induction heating-type heating apparatus, the magnetic flux adjusting means (mechanism) as a countermeasure to prevent temperature rise at the non-sheet passing portion starts an operation of the magnetic flux adjusting member by receiving information on a paper size (a recording material size) or an image signal (e.g., a copy start signal) as a detection means for operation input. For this reason, the magnetic flux adjusting mechanism is actuated even in such a mode that a copying job (e.g., for copying of not more than 10 sheets) is completed while the temperature of the heating medium does not reach a problematic temperature (unit thermal leakage temperature) in terms of the non-sheet passing area temperature rise. For this reason, deterioration in durability of the magnetic flux adjusting mechanism is accelerated and a probability of operation failure thereof becomes high.

SUMMARY OF THE INVENTION

The present invention has accomplished in view of the above described problems.

An object of the present invention, there is provided a heating apparatus of an electromagnetic induction heating-type capable of reducing the number of drive of a magnetic flux adjusting means as a countermeasure to prevent temperature rise at a non-sheet passing portion (area) to save energy consumption and realize a long-life apparatus.

According to an aspect of the present invention, there is provided an image heating apparatus, comprising:

magnetic flux generation means;

a heat generation member for generating heat by magnetic flux generated by the magnetic flux generation means, the heat generation member heating an image on a recording material;

a magnetic flux decreasing member for decreasing a part of the magnetic flux which is generated by the magnetic flux generation means and which acts on the heat generation member, the magnetic flux decreasing member being movable to a predetermined magnetic flux adjusting position so that a temperature of the heat generation member is in a predetermined temperature range;

temperature control means for controlling the temperature of the heat generation member in a recording material conveyance area so as to be a target temperature;

change means for changing the target temperature; and detection means for detecting a temperature of the heat generation member in a predetermined area;

wherein the change means lowers the target temperature when the temperature of the heat generation member in the predetermined area is increased to a predetermined temperature during heating and then the magnetic flux decreasing member is moved depending on a detection result of the detection means.

This and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Hereinbelow, the present invention will be described in detail with reference to the drawings.

(Embodiment 1)

(1) Image Forming Apparatus

Figure 1:
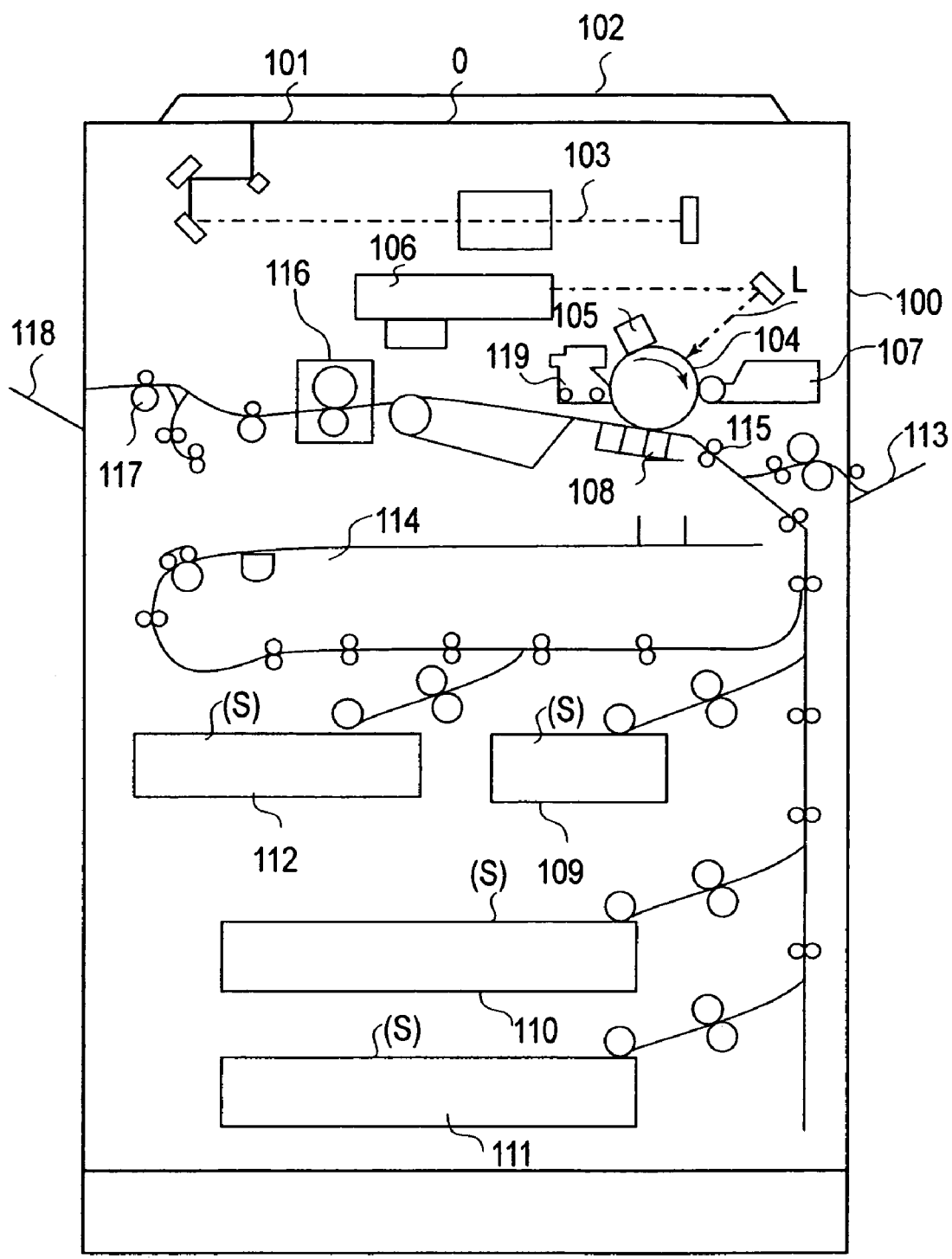
FIG. 1 is a schematic structural view of an image forming apparatus used in Embodiment 1.

FIG. 1 is a schematic structural view of an image forming apparatus 100 in this embodiment, which is a laser copying machine using a transfer-type electrophotographic process.

Referring to FIG. 1, on an original supporting glass plate 101, an original O is placed with an image surface down in accordance with a predetermined mounting standard and thereon, an original pressing late 102 is mounted to cover and set the original. When a copy start key is pressed, an image photoreader (a reader portion) 103 including a moving optical system is actuated to perform photoreading processing of image information at the downward image surface of the original O on the original supporting glass plate 101. The original O may also be automatically fed onto the original supporting glass plate 101 by mounting an original automatic feeder (ADF or RDF) on the original supporting glass plate 101.

A rotation drum-type electrophotographic photosensitive member (photosensitive drum) 104 is rotationally driven in a clockwise direction indicated by an arrow at a predetermined peripheral speed. During the rotation, the photosensitive drum 104 is subjected to uniform, change processing by a charging apparatus 105 to have a predetermined polarity and a predetermined electric potential, and the uniformly charged surface of the photosensitive drum is exposed to imagewise exposure light L by an image writing apparatus 106. As a result, an electric potential at a light part of the uniformly charged surface is attenuated to form an electrostatic latent image corresponding to an exposure pattern on the surface of the photosensitive drum 104. The image writing apparatus 106 is a laser scanner in this embodiment and outputs the laser light L modulated i correspondence with a time-series electric digital pixel signal of the original image information photo-read by the above-described photoreader 103, so that the uniformly charged surface of the rotating photosensitive drum 104 is subjected to scanning exposure to form thereon an electrostatic latent image corresponding to the original image information.

Then, the electrostatic latent image is developed with developer (toner) by a developing apparatus 104 to provide a toner image. The toner image is electrostatically transferred onto a recording material S as a material to be heated, fed from a sheet feeding mechanism portion to a transfer portion as an opposite portion between the photosensitive drum 104 and a transfer charging apparatus 107 at predetermined control timing at a position of the transfer charging apparatus 108.

The sheet feeding mechanism portion is constituted by first to fourth cassette sheet feeding portions 109–112, a multi-purpose (MP) tray 113, and an inversion sheet re-feeding portion 114. The recording material S is selectively fed from a corresponding portion of the sheet feeding mechanism portion, and is timely fed to the transfer portion by registration rollers 115.

The recording material onto which the toner image is transferred from the surface of the photosensitive drum 104 at the transfer portion is separated from the photosensitive drum 104 surface and is conveyed to a fixing apparatus 116, as the heating apparatus according to the present invention, where an unfixed toner image is fixed on the recording material surface and the recording material is discharged on a discharge (output) tray 118 located outside the image forming apparatus by a discharge roller 117.

On the other hand, the surface of the photosensitive drum 104 after the separation of the recording material therefrom is cleaned by a cleaning apparatus 119 so as to remove attached contaminant such as transfer residual toner and is repetitively subjected to image formation.

In the case of double-sided copying mode, the recording material which has already been subjected to first surface copying and comes out of the fixing apparatus 116 is introduced into a reverse re-feeding portion 114 where the recording material is reversed and re-fed to the transfer portion, where the toner image is transferred onto a second surface of the recording material. The recording material is again passed through the fixing apparatus 116 and is discharged on the discharge tray 118, located outside the image forming apparatus, by the discharge roller 117.

Incidentally, the copying machine in this embodiment is a multi-function machine also having a printer function and a facsimile function. However, these functions are not essential to the present invention, thus being omitted from explanation.

(2) Fixing Apparatus

Figure 2:
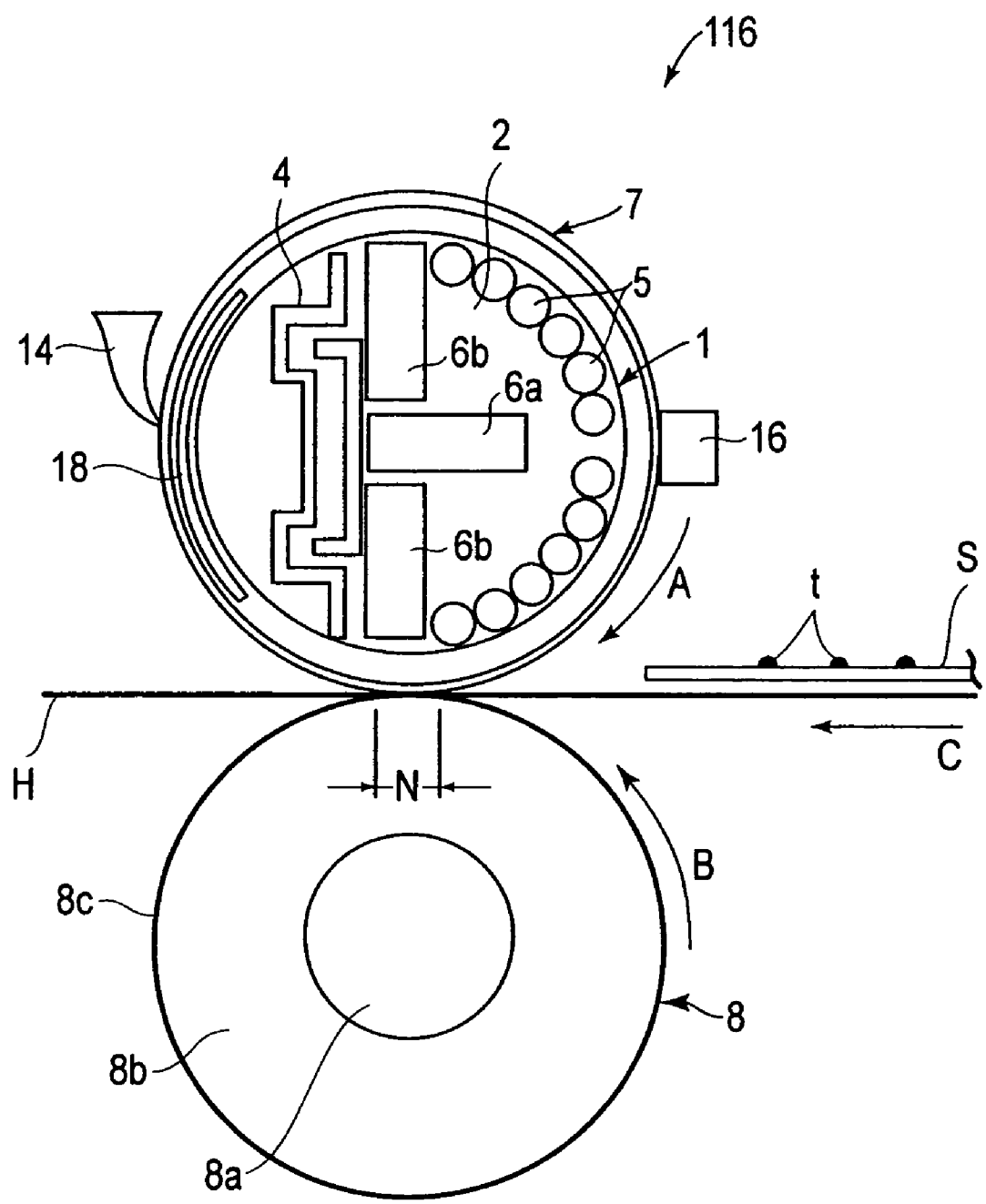
FIG. 2 is a schematic transverse cross-sectional view of a fixing apparatus used in Embodiment 1.
Figure 3:
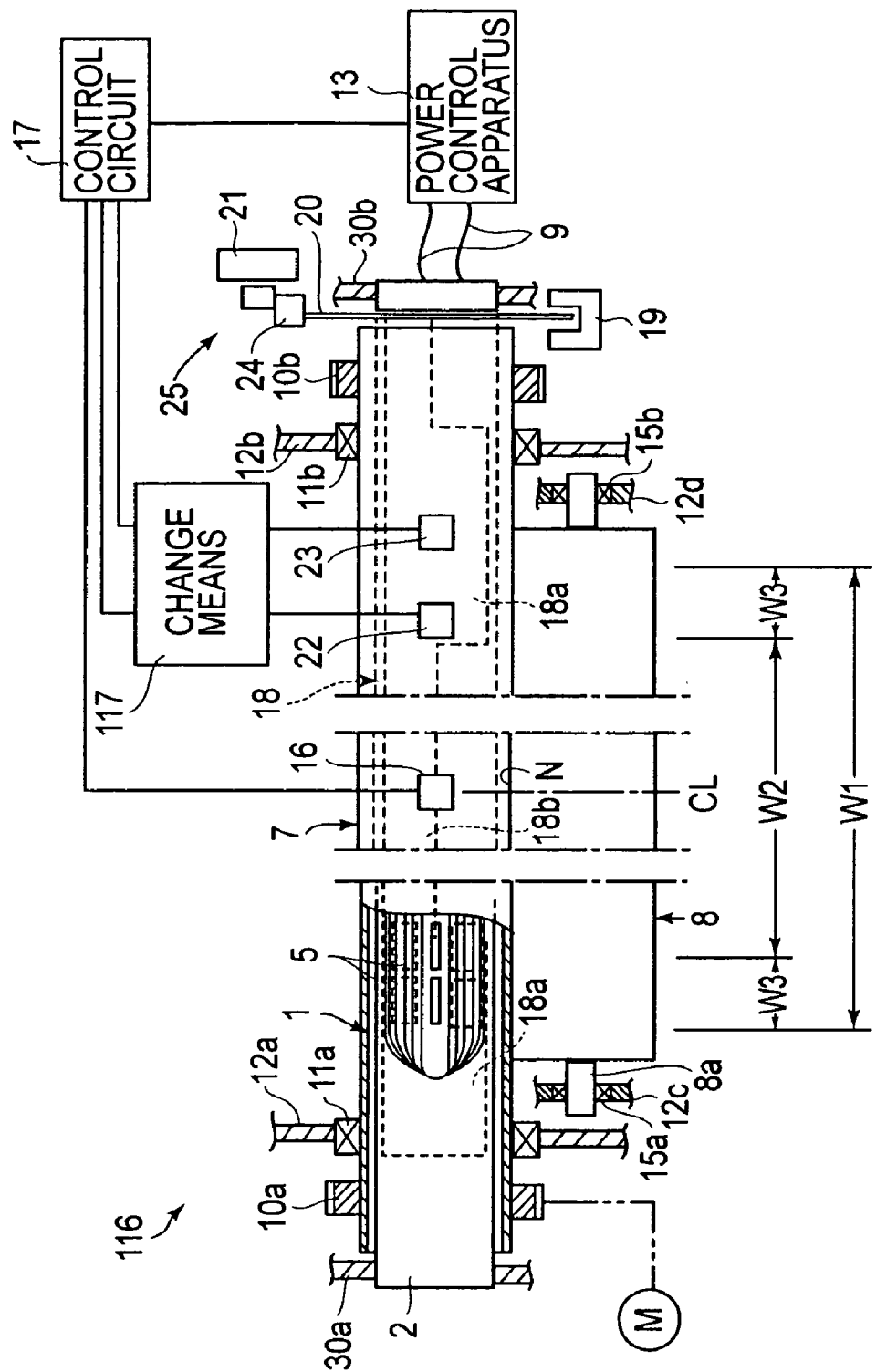
FIG. 3 is a schematic longitudinal cross-sectional view of the fixing apparatus used in Embodiment 1.

FIG. 2 is a schematic vertical cross-sectional view of the fixing apparatus 116 (in a shorter direction thereof), and FIG. 3 is a schematic longitudinal cross-sectional view of the fixing apparatus 116 (in a longer direction thereof).

The fixing apparatus 116 in this embodiment is of an electromagnetic induction type and is of a magnetic flux adjusting type using a magnetic flux adjusting means, according to the present invention.

Referring to these figures, a cylindrical fixing roller 7 as a heat generation member causing electromagnetic induction heating is rotatably held between apparatus side plates 12a and 12b via bearings 11a and 11b. The fixing roller 7 may preferably be formed of metal, such as iron, nickel, or cobalt. By using such a ferromagnetic metal (metal having a high permeability), it is possible to confine a larger amount of magnetic flux generated by magnetic flux generation means 5, 6a and 6b in the metal. In other words, it is possible to increase a magnetic flux density. As a result, an eddy current is efficiently generated on the surface of the ferromagnetic metal to generate heat. The fixing roller 7 has a thickness of approximately 0.3–2 mm, thus decreasing heat capacity. On an outer surface of the fixing roller 7, an unshown toner release layer is disposed and formed of a 10–50 μm-thick film of PTFE or PFA. It is also possible to form a rubber layer at an inner surface of the toner release layer.

A heating assembly 1 described in detail layer is disposed in the fixing roller 7 and comprises an exciting coil 5, cores 6a and 6b, a holder 2 which is a supporting member for these members, etc.

Under the fixing roller 7, an elastic pressure roller 8 as a pressing member is disposed in parallel with the fixing roller 7 and is constituted by an iron-made core metal 8a, a silicone rubber layer 8b disposed at an outer peripheral surface of the core metal 8a, and a toner release layer 8c, similarly as in the fixing roller 7, disposed on the silicone rubber layer 8b. The pressure roller 8 is disposed so that the core metal 8a is rotatably held between pressure roller supporting members 12c and 12d via pressure roller bearings 15 and 15b. Further, the pressure roller supporting members are urged by an unshown urging means so that the pressure roller 8 is pressed against the lower surface of the fixing roller 7 at a predetermined pressing force while resisting the elasticity, thus forming a fixing nip (portion) N as a heating portion having a predetermined width.

The fixing roller 7 is rotationally driven in a clockwise direction of an arrow A shown in FIG. 2 at a predetermined peripheral speed by transmitting a rotational force from a driving system M to a fixing roller gear 10a which is one of gears fixed at both ends of the fixing roller 7. The pressure roller 8 is rotated by the rotation of the fixing roller 7 in a counterclockwise direction of an arrow B.

To the exciting coil 5 of the heating assembly 1 disposed in the fixing roller 7, power (high-frequency current) is supplied from a power control apparatus (exciting circuit) 13 as a power supply means, whereby the fixing roller 7 as an induction heat generation member generates heat through induction heating (Joule heat due to eddy-current loss) by the action of magnetic flux (alternating magnetic field) generated from the heating assembly 1. A temperature of this fixing roller 7 is detected by a first temperature detection means (themistor) 16 disposed opposite to the fixing roller 7 at a substantially central position on the surface of the fixing roller 7 in the longitudinal direction of the fixing roller 7. A detected temperature signal is inputted into a control circuit 17 as a temperature control means comprising a CPU and memories such as RAM and ROM.

The control circuit 17 controls the power supplied from the power control apparatus 13 to the exiting coil 5 of the heating assembly 1 is accordance with a temperature control program stored in the memory so as to keep the detected temperature, of the fixing roller 7, inputted from the first temperature detection means 16 at a predetermined fixing temperature, thus effecting temperature control of the fixing roller temperature at the predetermined fixing temperature (target temperature).

In such a state that the fixing roller 7 and the pressure roller 8 are rotationally driven as described above and the fixing roller 7 is temperature-controlled at the predetermined fixing temperature through the induction heating by supplying the power to the exciting coil 5 of the heating assembly 1, the recording material S on which the unfixed toner image t is electrostatically transferred at the above described transfer portion of the image forming apparatus and is carried is introduced into the fixing nip N through a recording material conveyance path H from a direction of an arrow C as shown in FIG. 2 and is conveyed under a nipped state. During the conveyance under the nipped state, the unfixed toner image t on the surface of the recording material S is fixed on the recording material S surface as a permanent image under heat by the fixing roller 7 and nip pressure.

A separation claw 14 suppresses winding of the recording material S, which is introduce into the fixing nip N and comes out of the fixing nip N, around the fixing roller 7, thus functioning as a means for separating the recording material S from the fixing roller 7. Sheet passing of the recording material S through the fixing apparatus 116 is performed by center-line basis conveyance. Referring to FIG. 3, W1 represents a maximum-sized sheet width with respect to the fixing apparatus 116 and W2 represents a small-sized sheet width. Further, W3 represents a non-sheet passing portion (area) created in the fixing nip N when the recording material S having the small-sized sheet width W2 is passed through the fixing nip N, thus corresponding to a differential area between the maximum-sized sheet width W1 and the small-sized sheet width W2. CL represents a sheet passing center line in the center-line basis conveyance.

In the longitudinal (lengthwise) direction of the fixing roller 7, on the surface of the fixing roller 7, a first shutter themistor (1) 22 (temperature detecting element) as a temperature information detection means for detecting a temperature in the non-sheet passing area W3 (an area having the width W3 in which the recording material S is not passed through the nip N) is disposed opposite to the non-sheet passing area W3, and a second shutter themistor (2) 23 (temperature detection element) as a temperature information detection means for detecting a temperature in an area located outside the non-sheet passing area W3 is disposed opposite to the area.

Depending on detection results of the temperature information detection means 22 and 23, a change means 117 changes and determines a target temperature of the fixing roller 7 to the temperature-controlled by the control circuit 17 to a preliminarily determined set temperature.

With respect to the fixing apparatus 116 in this embodiment, the maximum-sized sheet width W1 is A4-sized sheet width (297 mm) and the small-sized sheet width (297 mm) and the small-sized sheet width W2 is A4R-sized sheet width (210 mm). In this embodiment, the maximum-sized sheet width W1 corresponds to an ordinary-sized sheet with and is hereinafter referred to as the ordinary-sized sheet width.

(3) Heating Assembly 1

The heating assembly 1 is constituted by the holder 2, the exciting coil 5 constituting the magnetic flux generation means, the magnetic (material) cores 6a and 6b, a stay for supporting the exciting coil 5 and the magnetic cores 6a and 6b, etc.

The holder 2 is formed of a heat-resistant resin and has a vertical cross-sectional shape which is a semicircular and tub-like shape. The holder 2 is supported in a non-rotational manner by holder supporting plates 30a and 30b disposed outside the apparatus side plates 12a and 12b at both ends thereof in such a position that a semicircular cylindrical-shaped surface is directed toward the recording material introduction side, and is disposed in such a state that it does not contact an inner surface of the fixing roller with a predetermined spacing therefrom. At an almost central portion at an inner surface of the holder 2, a plurality of first magnetic material cores 6a (hereinafter simply referred to as "first core(s) 6a" are disposed in a longitudinal direction of the holder 2. The first cores 6a are disposed in a length substantially identical to the ordinary-sized sheet width W1 and located in correspondence with the ordinary-sized sheet width portion. The holder 2 in this embodiment is a molding member of a nonmagnetic resinous material comprising PPS-based resin, which has a heat resistance and a mechanical strength, and glass added in the PPS-based resin. In addition to the PPS-based resin, as the nonmagnetic material, it is also possible to suitably use PEEK-based resin, polyimide resin, polyamide resin, polyamide-imide resin, ceramics, liquid crystal polymer, fluorine-containing resin, etc.

The exciting coil 5 (hereinafter simply referred to as a "coil 5") is also disposed at the inner surface of the holder 2 so that it is wound and held around the first cores 6a as a winding center portion. The coil 5 is required to generate alternating magnetic flux sufficient for heating. For that purpose, the coil 5 is required to have a lower resistance component and a higher inductance component. As an example thereof, in this embodiment, litz wire comprising 20–200 conducting strands woven together and each coated with an insulating material is used. More specifically, as a coil material, litz wire which is constituted by 140 strands each having an outer diameter of 0.17 mm and has a total outer diameter of 4 mm is used. IN view of temperature rise of the coil 5, insulating coating is performed by use of a heat-resistant material.

A holder cap 4 for capping the almost semicircular tub-like holder 4 in vertical cross-section is, engaged with the holder 2 in which the first cores 6a and the coil 5 are disposed as described above. Between the holder 2 and the holder cap 4, the first cores 6a and the coil 5 are forcedly pressed and held. In a longitudinal direction of the holder cap 4, two second magnetic material cores 6b each comprising a plurality of cores (hereinafter, simply referred to as "second core(s) 6b") are disposed and held so as to sandwich the first cores 6a therebetween. These second cores 6b each have a length corresponding to the ordinary-sized sheet width W1 and are disposed in correspondence with the ordinary-sized sheet width portion.

Each of the above-described first cores 6a and second cores 6b may preferably have a high permeability and a low loss in order to increase an efficiency of the magnetic circuit and realize magnetic shielding. As a material for the first cores 6a and the second cores 6b, e.g., it is possible to use a magnetic material, generally as a core of a transformer, such as ferrite, permalloy, etc.

(4) Magnetic Flux Adjusting Apparatus

In the fixing apparatus described in (2) above, the magnetic flux adjusting apparatus as the magnetic flux adjusting means comprises the magnetic flux adjusting member as the magnetic flux decreasing member (the shutter for shielding a part of magnetic flux) 17 which is disposed in a spacing between the heating assembly 1 and the fixing roller 7 as the induction heat generation member and is moved in a circumferential direction of the fixing roller 7, and a moving means 25 for moving the magnetic flux adjusting member 18 to an arbitrary position. The moving means 20 is constituted by a magnetic flux adjusting member drive gear 20 connected with the magnetic flux adjusting member 18, a gear train 24 for supplying a driving force to the drive gear 20, a magnetic flux adjusting member drive motor 21 as a drive power source, a gear position sensor 19 for detecting a position of the magnetic flux adjusting member 18, etc. The magnetic flux adjusting member drive gear 20 is provided with slits for positional detection at two magnetic flux adjusting (shielding) positions and a retracted position where the magnetic flux is not adjusted (shielded or decreased).

The magnetic flux adjusting member 18 comprises a shielding portion 18a, a supporting portion 18b, etc., and is secured to the magnetic flux adjusting member drive gear 20 at one end thereof. In this embodiment, the magnetic flux adjusting member 18 has a shape changed in a direction (longitudinal direction f the fixing roller 7) perpendicular to the conveyance direction of the recording material S. More specifically, both end portions of the magnetic flux adjusting member 18 connected by the supporting portion 18b are extended in a projection-like shape in a circumferential direction of the fixing roller 7 to form the shielding portion 18a which shields the alternating magnetic flux. A width and a position of the shielding portion 18a in the longitudinal direction are determined depending on the size of the recording material S to be assumed that it requires the magnetic flux shielding.

As a material for the magnetic flux adjusting member 18, it is possible to suitably use copper, aluminum, silver, or their alloys which are an electric conductor for carrying induction current and are a nonmagnetic material having a small specific resistance, and ferrite or the like having a large specific resistance for confirming the magnetic flux. Further, with respect to the magnetic material such as iron or nickel, it is also possible to use it by forming therein a through hole such as a circular hole or a slit to suppress heat generation by eddy current.

Figure 4:
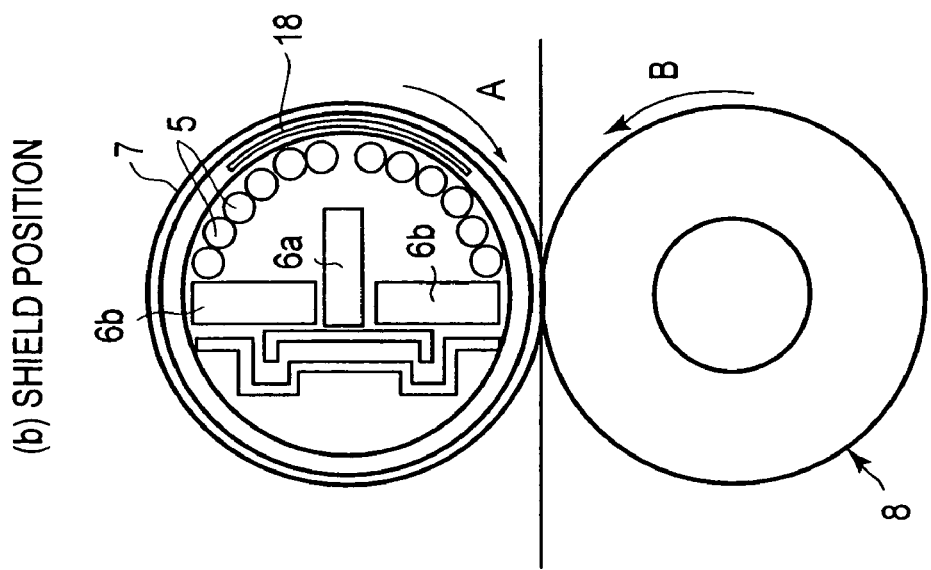
FIGS. 4(*a*) and 4(*b*) are operational views for illustrating a retracted position (FIG. 4(*a*)) and a shielding position (FIG. 4(*b*)) of a magnetic flux adjusting member of the fixing apparatus used in Embodiment 1.
Figure 4:
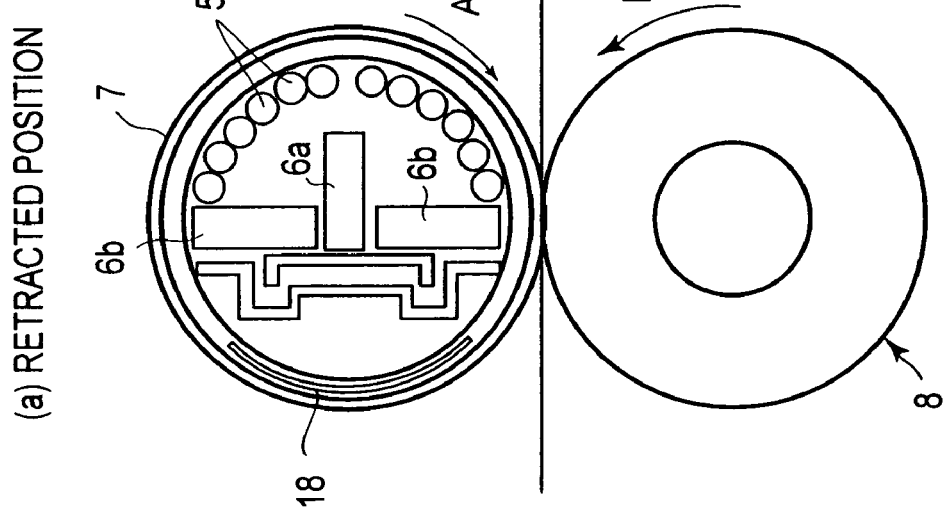

The magnetic flux adjusting member 18 is ordinarily held in a retracted position therefor was a home position located opposite from the coil 5 of the heating assembly 1 in the fixing roller 7 as shown in FIG. 4(a). The retracted position (home position) is a position where the magnetic flux from the heating assembly does not substantially act on the fixing roller 7. Further, as shown in FIG. 4(b), the magnetic flux adjusting member 18 is also held at a position located on the coil 5 side of the heating assembly 1 in the fixing roller 7 as a shielding position. This shielding position is a working magnetic flux shielding position where a part of the magnetic flux acting from the heating assembly 1 on the fixing roller 7 is shielded by the shielding portion 18a at the non-sheet passing portion W3.

The magnetic flux adjusting member 18 is shaped so that it shields the non-sheet passing portion W3 of the small-sized recording material as described above, whereby it is possible to prevent excessive temperature rise, at the non-sheet passing portion W3 which is an end portion of the fixing roller 7, liable to occur when the small-sized recording material is continuously conveyed. More specifically, in FIG. 4(a), the magnetic flux adjusting member 18 is in the magnetic flux adjusting member retracted position, so that the alternating magnetic flux which is guided by the cores 6a and 6b toward the fixing nip N is not shielded in an entire are of the fixing roller 7 in the longitudinal direction of the nip N, thus causing the entire area of the fixing roller 7 in the longitudinal direction to generate heat through electromagnetic induction heating. On the other hand, in FIG. 4(b), the magnetic flux adjusting member 18 is in the shielding position, so that a part of the alternating magnetic flux, which is guided by the cores 6a and 6b toward the fixing nip N, is shielded by the shielding portion 18a (at an end portion (area) the fixing roller 7 in the longitudinal direction). As a result, it becomes possible to suppress heat generation of the fixing roller 7 at the non-sheet passing portion W3 which is the end portion of the fixing roller 7 in the longitudinal direction.

The magnetic flux adjusting member 18 is rotationally moved from the retracted position (home position) to the shielding position or from the shielding position to the retracted position by rotationally driving the magnetic flux adjusting member drive motor 21 by means of the control circuit 17 on the basis of a positional signal of the magnetic flux adjusting member 18 detected by the gear position sensor 19 and a detection signal from an unshown size detection sensor for detecting the size of the recording material S to be used and passed through the fixing hip N.

Incidentally, in the present invention, as the magnetic flux adjusting means, the shutter for shielding a part of the magnetic flux acting from the coil on the fixing roller is described as an example. However, the magnetic flux adjusting means is not limited thereto. It is also possible to adjust a magnetic flux density of the fixing roller in the longitudinal direction, e.g., by disposing a magnetic material (member), which is moved relative to the coil, so as to change a magnetic flux path from the coil to the fixing roller.

(5) Continuous Copying Job Sequence of Small-Sized Recording Material

With respect to a small-sized (B5R) recording material S, when a continuous copying (output) job is instructed by a user from an operation panel (not shown) provided on the image forming apparatus 100, the control circuit 17 executes the continuous copying job sequence on the basis of an output signal from the operation panel. Incidentally, in this embodiment, the number of sheets conveyed per unit time (i.e., throughput) for the continuous copying job of the small-sized recording material is identical to that in the case of the continuous copying job of the maximum (large)-sized recording material. In other words, an identical interval is employed for the recording materials at the time of continuous copying.

Figure 5:
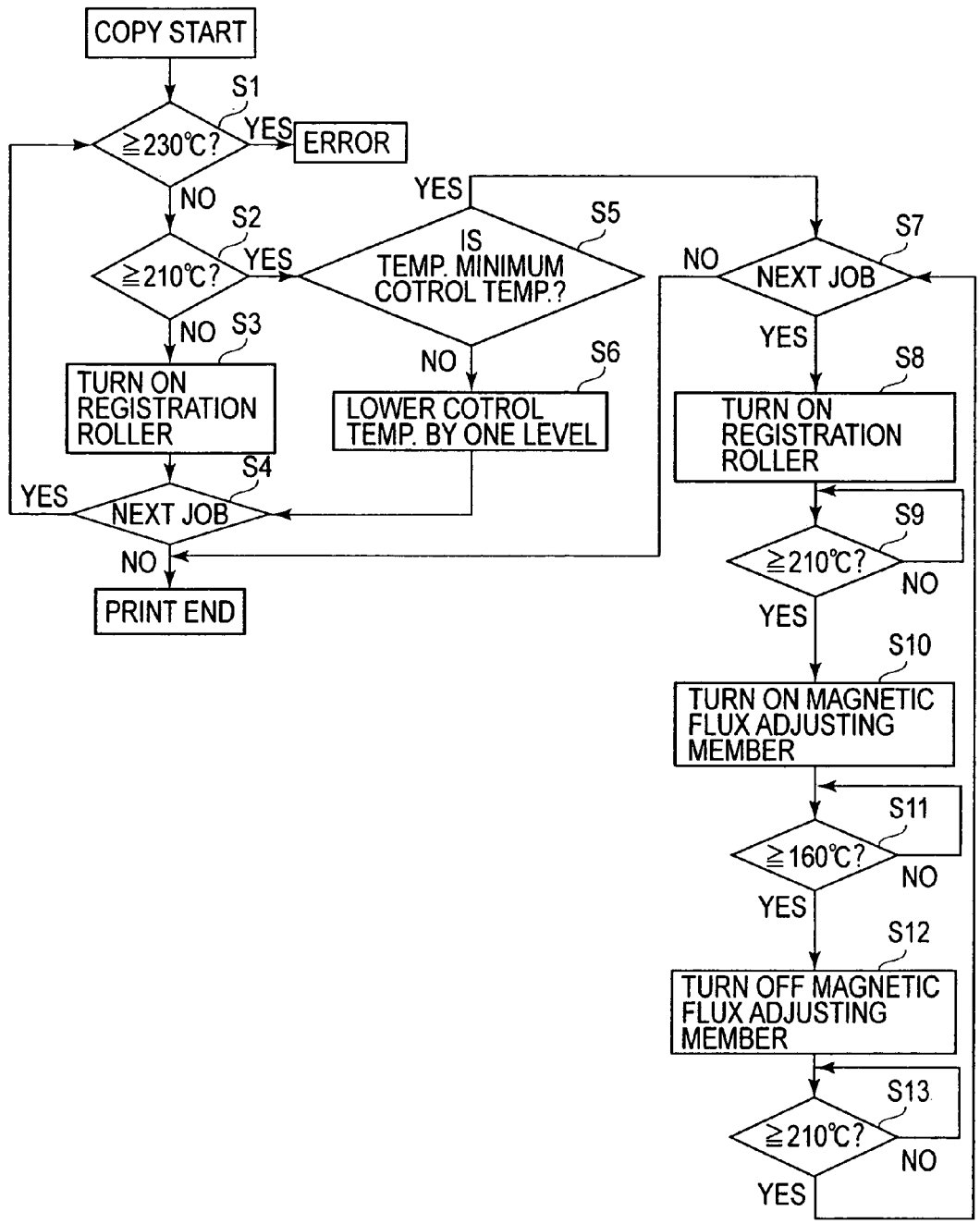
FIG. 5 is a flow chart of a continuous copying job sequence of a small-sized recording material in the image forming apparatus used in Embodiment 1.
Figure 6:
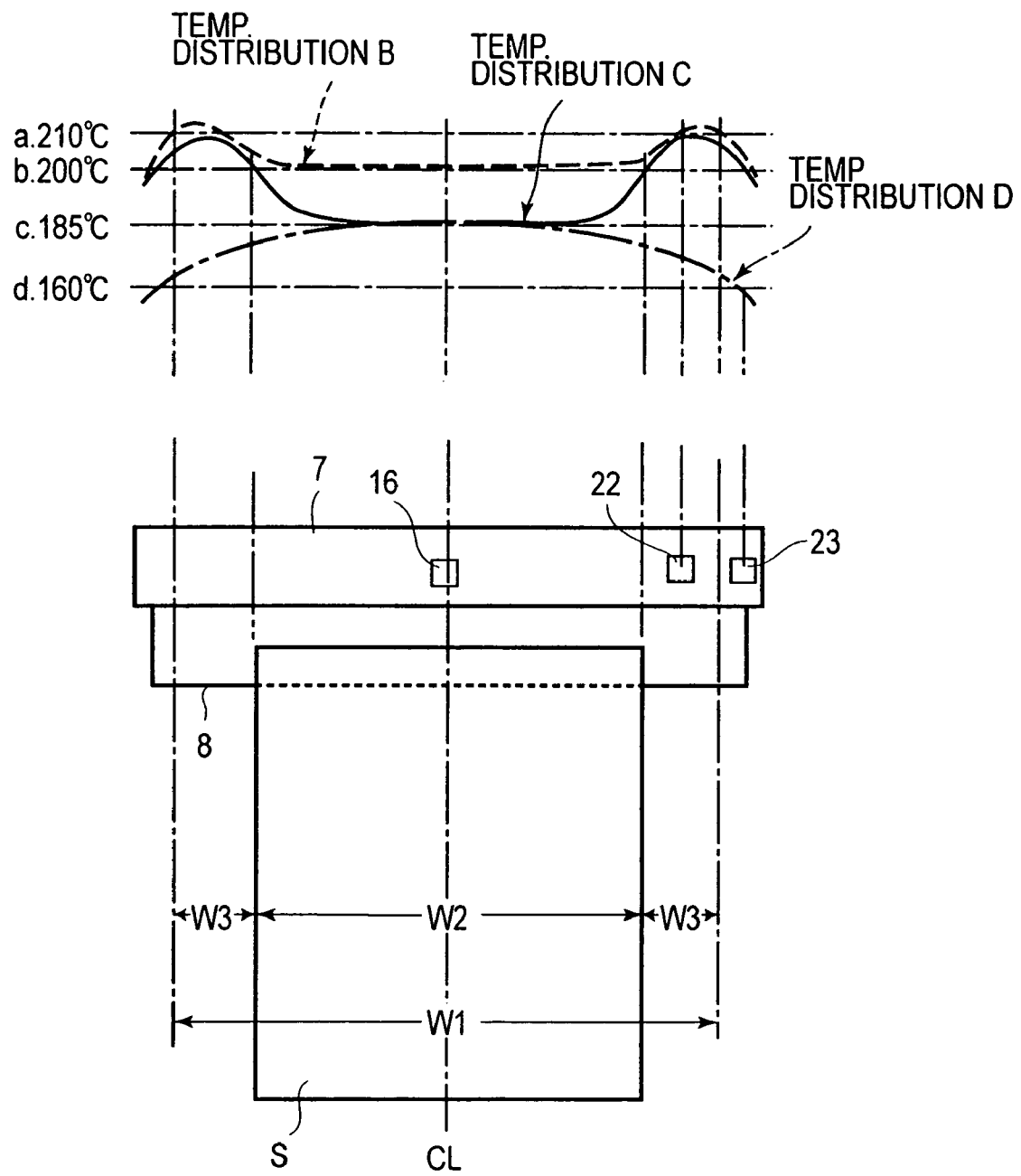
FIG. 6 is an explanatory view for illustrating temperatures and temperature distributions at the time of the copying job sequence.

FIG. 5 shows a flow chart of the continuous copying job in this embodiment, and FIG. 6 shows temperature distributions of the fixing roller during the sequence operation.

Referring to FIG. 5, when the continuous copying job is started, temperatures detected by the shutter themistor (1) 22 and the shutter themistor (2) 23 are started to increase at the same time.

In a step S1, when the detected temperature of the shutter themistor (1) 22 or the shutter themistor (2) 23 is not less than 230° C. (i.e., the case of "YES"), a judgement that an error occurs is made. When the detected temperature is less than 230° C. ("No"), the sequence goes to a step S2.

In the step S2, when a detected temperature by the shutter themistor (1) 22 or the shutter themistor (2) 23 is not in the range of 210–230° C. ($\geqq$210° C. in FIG. 5) ("No"), the sequence goes to a step S3.

In the step S3, the registration rollers 115 are turned on and print (copying operation) is performed, and then the sequence goes to a step S4. More specifically, the small-sized recording material S is timely fed to the transfer portion by the drive of the registration rollers 115 and after being subjected to transfer of the toner image from the photosensitive drum 104 surface onto the recording material surface at the transfer portion, is conveyed to the fixing apparatus 116 and passed through the fixing nip N to be subjected to fixing of the toner image thereon.

In the step S4, a judgement as to whether or not there is subsequent copying job. When there is the subsequent copying job ("Yes"), the sequence is returned to the step S1, and when there is no subsequent copying job ("No"), the print is completed.

By repeating the above described steps S1–S4, a certain number of sheets of the small-sized recording material S are passed through the fixing nip N where the print is performed. During the print, at the time when the detection temperature by the shutter themistor (1) 22 reaches 210° C. (a temperature distribution B shown in FIG. 6), a sheet passing control temperature is decreased stepwise by controlling the charge means 117 for changing the target temperature of the fixing roller (or the power supplied to the coil) (steps S5 and S6). After the sheet passing control temperature is decreased to a minimum control temperature of 185° C. but the small-sized recording material S is supplied with heat from the recording material end portion side, i.e., from the non-sheet passing portion W3, in the fixing nip N and an amount of heat loss of the fixing roller 7 is smaller than that for the maximum-sized recording material.

As described above, even when the temperature rise at the non-sheet passing portion is caused to occur, by lowering the control temperature, energy (power) for heating the non-sheet passing portion is suppressed or decreased, so that the temperature rise at the non-sheet passing portion is alleviated. Further, due to the non-sheet passing portion temperature rise, it is possible to obtain a desired fixability even when the control temperature is decreased. As a result, it becomes possible to prolong a time required to actuate the shutter thermistor. In other words, it is possible to reduce the number of drive of the shutter thermistor.

In the step S7, when there is a subsequent copying job ("Yes"), the sequence goes to a step S8. When there is no subsequent copying job ("No"), the print operation is completed.

In the step S8, the registration roller 115 are driven and the print (copying operation) is performed, and then the sequence goes to a step S9.

In the step S9, the temperature at the non-sheet passing portion W3 is increased again by passing the small-sized recording material through the fixing nip N in the step S7. From that state, the sequence goes to a step S10 when the detection temperature of the shutter thermistor (1) 22 reaches 210° C. (a temperature distribution C in FIG. 6).

In the step S10, the control temperature detected by the first temperature detection means 16 is the minimum control temperature. At that time, the magnetic flux adjusting member drive motor 21 is first driven to move the magnetic flux adjusting member 18 to the magnetic flux shielding position, thus turning the magnetic flux adjusting member 18 on. More specifically, the magnetic flux adjusting member 18 is started to move from the retracted position to the magnetic flux shielding position where the magnetic flux at the non-sheet passing portion W3 is shielded. When the recording material is further passed through the nip N continuously, the roller surface temperature at the non-sheet passing portion W3 at which the magnetic flux is shielded is continuously lowered.

In this embodiment, the temperature at which the movement of the magnetic flux adjusting member to the predetermined magnetic flux adjusting position is started, i.e., a working temperature of the magnetic flux adjusting means (S9) and the temperature for decreasing the target temperature (S2) are identical to each other. However, the temperature for decreasing the target temperature may be lower or higher than the working temperature.

In a step S11, at the time when a temperature detected by the shutter thermistor (2) 23 reaches a temperature not more than 160° C. (a temperature distribution D in FIG. 6) in such a state that the magnetic flux at the non-sheet passing portion W3 is shielded by the magnetic flux adjusting member 18, the sequence goes to a step S12.

In the step S12, the magnetic flux adjusting member drive motor 21 is driven to move the magnetic flux adjusting member 18 from the magnetic flux shielding position to the retracted position (FIG. 4(a)), thus turning the magnetic flux adjusting member 18 off. When the recording material is further passed through the nip N continuously, the magnetic flux generated by the magnetic flux generation means 5, 6a and 6b is supplied to the non-sheet passing portion W3, whereby the roller surface temperature at the non-sheet passing portion W3 is started to increase again.

In a step S13, when the detection temperature of the shutter thermistor (1) 22 reaches 210° C. in such a state that the magnetic flux adjusting member 18 is moved to the retracted position, the sequence goes to the step S7.

As described above, in the image forming apparatus used in the present invention, the surface temperature, at the end portion of the fixing roller 7, which his increased from the time of starting the copying of the small-sized recording material is detected by the temperature detection element (the shutter thermistor (1) 22) provided at the non-sheet passing portion W3, and when the detected temperature reaches not less than the certain temperature range (210–230° C.), the control temperature is lowered by one level. This operation is repeated plural times, and after the surface temperature of the fixing roller 7 reaches the minimum control temperature of the plurality of control temperatures with respect to the fixing apparatus 116, movement of the magnetic flux adjusting member 18 is first started at the time when the temperature detected by the temperature selection element reaches the predetermined temperature (210° C.).

In other words, until the copying job is completed, the operations from the step S1 to the step 13 described above are repetitively performed to prevent the fixing roller surface temperature from reaching the thermal (heat) breakage temperature. In addition, at the control temperature in a sheet passing initial stage, the magnetic flux adjusting member 18 is not operated to prolong the time required for the temperature at the non-sheet passing portion W3 to reach the thermal breakage temperature by lowering the control temperature, whereby it becomes possible to reduce the number of operations of the magnetic flux adjusting member 18 in the copying job further small number of copying sheets.

Accordingly, in the fixing apparatus 116 of this embodiment, with respect to not only such a short job that the copying job is completed with no reaching of the fixing roller surface temperature to a problematic temperature in terms of the temperature rise at the non-sheet passing portion (the unit thermal breakage temperature) (i.e., at such a mode that the non-sheet passing portion temperature rise is of no problem) but also a copying job on such a number of copying sheets of the small-sized recording material that the non-sheet passing portion temperature rise becomes problematic, the operation number of the magnetic flux adjusting member 18 can be reduced by lowering the control temperature so as not to operate the magnetic flux adjusting apparatus. As a result, it is possible to alleviate the deterioration in durability of the magnetic flux adjusting apparatus and the occurrence of operation failure thereof, thus resulting in an improvement in reliability.

Incidentally, in this embodiment, the number of conveyance sheets per unit time (throughput) for the continuous copying job of the small-sized recording material is identical to that of the large (maximum)-sized recording material but may be different therefrom.

(Embodiment 2)

In this embodiment, with respected to a fixing apparatus, a continuous copying job sequence of the small-sized recording material controlled by the control circuit 17 is different from that in Embodiment 1. More specifically, in the continuous copying job, from the number of copying sheets of the small-sized recording material inputted by the user, the number of copying sheet (27-th copying sheet in this embodiment) for which the temperature at the end portion of the fixing roller 7 becomes 215° C. is estimated, and at the time when the copying sheet number reaches the estimated copying sheet number, the control temperature in the initial sheet passing stage is decreased to a lower control temperature. This operation is repetitively performed plural times, and after the surface temperature at the end portion of the fixing roller 7 reaches the minimum control temperature of a plurality of control temperatures with respect to the fixing apparatus 116 (after the copying job on the 47-th sheet in this embodiment), the operation of the magnetic flux adjusting member 18 is started. Other constitutions of the fixing apparatus and identical to those in Embodiment 1, thus being omitted from repetitive explanation.

According to this embodiment, it is also possible to achieve actions and effects similar to those in Embodiment 1.

(Miscellaneous)

1) The control temperature is determined and set on the basis of at least one of factors including detection temperatures for constituting parts of the fixing roller or the fixing apparatus or parts in the neighborhood thereof, the size of recording material, a weight per unit area of the recording material, the number of conveyance sheets of the recording material, and a conveyance time of the recording material.
2) The shape of the heat generation member is not limited to a roller-shape but may be an endless belt-shape with respect to an induction heat generation member. It is also possible to use a rolled-up long-length film, which is formed of an induction heat generation member and has an end, moved at a predetermined speed toward a winding-up axis side through a lower portion of a magnetic flux generation means.
3) The fixing apparatus in the above described embodiments employs the center-line basis conveyance of the material to be heated (sheet material). However, the present invention is also applicable to a fixing apparatus having such a constitution that the sheet material is conveyed according to one-side basis.
4) The fixing apparatus in the above described embodiments is adapted to the two kinds of the materials to be heated (sheet materials) including the large- and small-sized recording materials. The present invention, however, is applicable to three or more kinds of the sheet materials.

In the present invention, the control temperature is changed to reduce energy (power) supplied to the fixing roller, whereby a time required for the temperature at the non-sheet passing portion to reach the shutter thermistor working (operation) temperature is prolonged to decrease the drive number of the magnetic flux adjusting member. However, the present invention is not restricted thereto but may, e.g., employ such a constitution that the power supplied to the coil is lowered without changing the control temperature. Further, it is also possible to adopt such a constitution that movement of the magnetic flux adjusting member 18 is started after the supplied power is lowered stepwise.

While the invention has been described with reference to the structures disclosed herein, it is not confined to the details set forth and this application is intended to cover such modifications or, changes as may come within the purpose of the improvements or the scope of the following claims.

This application claims priority from Japanese Patent Application No. 062446/2004 filed Mar. 5, 2004, which his hereby incorporated by reference.

What is claimed is:

1. An image heating apparatus for heating an image on a recording material by using a heat generating member which generates heat by magnetic flux generated by magnetic flux generation means for generating magnetic flux by energizing a coil, said image heating apparatus comprising:
    a magnetic flux adjusting member for adjusting magnetic flux acting on the heat generating member by changing its position relative to the magnetic flux generation means;
    drive means for driving said magnetic flux adjusting member to be movable between a first magnetic flux adjusting position and a second magnetic flux adjusting position so as to adjust a distribution of magnetic flux acting on the heat generating member in a widthwise direction perpendicular to a magnetic material conveyance direction of the heat generating member;
    energization control means for controlling energization of the coil so that a temperature of the heat generating member reaches a target temperature; and
    change means for changing the target temperature;
    wherein when the temperature of the heat generating member in an end area in the widthwise direction perpendicular to the recording material conveyance direction of the heat generating member is increased during continuous heating of a recording material having a size smaller than an available maximum size of the recording material, the recording material is passed through said image heating apparatus by changing the target temperature to a lower temperature by said change means and in this state, said magnetic flux adjusting member is driven by said drive means when the temperature of the heat generating member in the end area is increased.

2. An apparatus according to claim 1, wherein said change means changes the target temperature to a lower temperature in stages for each increase in temperature in the end area and after the target temperature is changed to a predetermined minimum temperature, said drive means drives said magnetic flux adjusting member.

3. An apparatus according to claim 1, wherein said image heating apparatus further comprises detection means for detecting the temperature of the heat generating member in the end are, and said change means changes the target temperature on the basis of a detection result of said detection means.

4. An apparatus according to claim 1, wherein said change means changes the target temperature on the basis of the number of sheets of the recording material having the size smaller than the available maximum size and passed through said image heating apparatus.

5. An apparatus according to claim 1, wherein said magnetic flux adjusting member adjusts magnetic flux acting on the heat generating member in the end area.

6. An apparatus according to claim 1, wherein a temperature of the heat generating member in the end area when said magnetic flux adjusting member is driven by said drive means is not less than a temperature of the heat generating member in the end area when said change means changes the target temperature to a lower temperature than the target temperature.

7. An image heating method for heating an image on a recording material by using an image forming apparatus including magnetic flux generated by magnetic flux generation means for generating magnetic flux by energizing a coil, a heat generating member for generating heat by magnetic flux generated by magnetic flux generated by the magnetic flux generation means, a magnetic flux adjusting member for adjusting magnetic flux acting on the heat generating member by changing its position relative to the magnetic flux generation means, drive means for driving said magnetic flux adjusting member to be movable between a first magnetic flux adjusting position and a second magnetic flux adjusting position so as to adjust a distribution of magnetic flux acting on the heat generating member in a widthwise direction perpendicular to a recording material conveyance direction of the heat generating member, energization control means for controlling energization of the coil so that a temperature of the heat generating member comes close to a target temperature, and change means for changing the target temperature, said image heating method comprising:
    a first step of passing a recording material through the image heating apparatus and changing the target temperature to a lower temperature by said change means when the temperature of the heat generating member in an end area in the widthwise direction perpendicular to the recording material conveyance direction of the heat generating member is increased during continuous heating of a recording material having a size smaller than an available maximum size of the recording material; and a second step of driving the magnetic flux adjusting member by the drive means when the temperature of the heat generating member in the end area is increased in a state in which the recording material is passed through the image heating apparatus in said first step.

* * * * *

UNITED STATES PATENT AND TRADEMARK OFFICE
CERTIFICATE OF CORRECTION

PATENT NO. : 7,098,430 B2
APPLICATION NO. : 11/068920
DATED : August 29, 2006
INVENTOR(S) : Toshiharu Kondo et al.

It is certified that error appears in the above-identified patent and that said Letters Patent is hereby corrected as shown below:

SHEET NO. 5 of 6:
Figure 5, "temperature;" should read --temperature--.

COLUMN 2:
Line 28, "division" should read --divisions--.

COLUMN 3:
Line 7, "has" should read --has been--.
Line 35, "area;" should read --area,--.

COLUMN 4:
Line 15, "late" should read --plate--.
Line 29, "uniform, change" should read --uniform charge--.
Line 39, "i" should read --in--.

COLUMN 5:
Line 51, "layer" should read --later--.

COLUMN 6:
Line 28, "is" should read --in--.
Line 51, "introduce" should read --introduced--.

COLUMN 7:
Line 1, "themistor" should read --thermistor--.
Line 6, "themistor" should read --thermistor--.
Line 14, "temperature-controlled" should read --temperature controlled--.
Line 18, "and the small-sized sheet width (297 mm)" should be deleted.
Line 21, "with" should read --width--.

COLUMN 8:
Line 1, "IN" should read --in--.
Line 5, "is," should read --is--.
Line 51, "f" should read --of--.

COLUMN 9:
Line 7, "therefor" should read --therefore--.
Line 31, "are" should read --area--.
Line 39, "(area)" should read --(area) of--.
Line 53, "hip" should read --nip--.

UNITED STATES PATENT AND TRADEMARK OFFICE
CERTIFICATE OF CORRECTION

PATENT NO. : 7,098,430 B2
APPLICATION NO. : 11/068920
DATED : August 29, 2006
INVENTOR(S) : Toshiharu Kondo et al.

It is certified that error appears in the above-identified patent and that said Letters Patent is hereby corrected as shown below:

COLUMN 10:
Line 16, "themistor" should read --thermistor--.
Line 17, "themistor" should read --thermistor--.
Line 20, "themistor" (both occurrences) should read --thermistor--.
Line 25, "themistor" (both occurrences) should read --thermistor--.
Line 39, "job." should read --job is made.--.
Line 47, "themistor" should read --thermistor--.
Line 49, "charge" should read --change--.

COLUMN 11:
Line 2, "drive" should read --drives--.
Line 7, "roller" should read --rollers--.

COLUMN 12:
Line 9, "step 13" should read --step S13--.
Line 44, "respected" should read --respect--.
Line 50, "sheet" (first occurrence) should read --sheets--.
Line 62, "and" should read --are--.

COLUMN 13:
Line 45, "or," should read --or--.
Line 48, "his" should read --is--.

COLUMN 14:
Line 27, "are," should read --area,--.

Signed and Sealed this

Twenty-eighth Day of August, 2007

JON W. DUDAS
*Director of the United States Patent and Trademark Office*